(No Model.)
A. H. DICKEY.
VEHICLE SPRING.
No. 312,441. Patented Feb. 17, 1885.
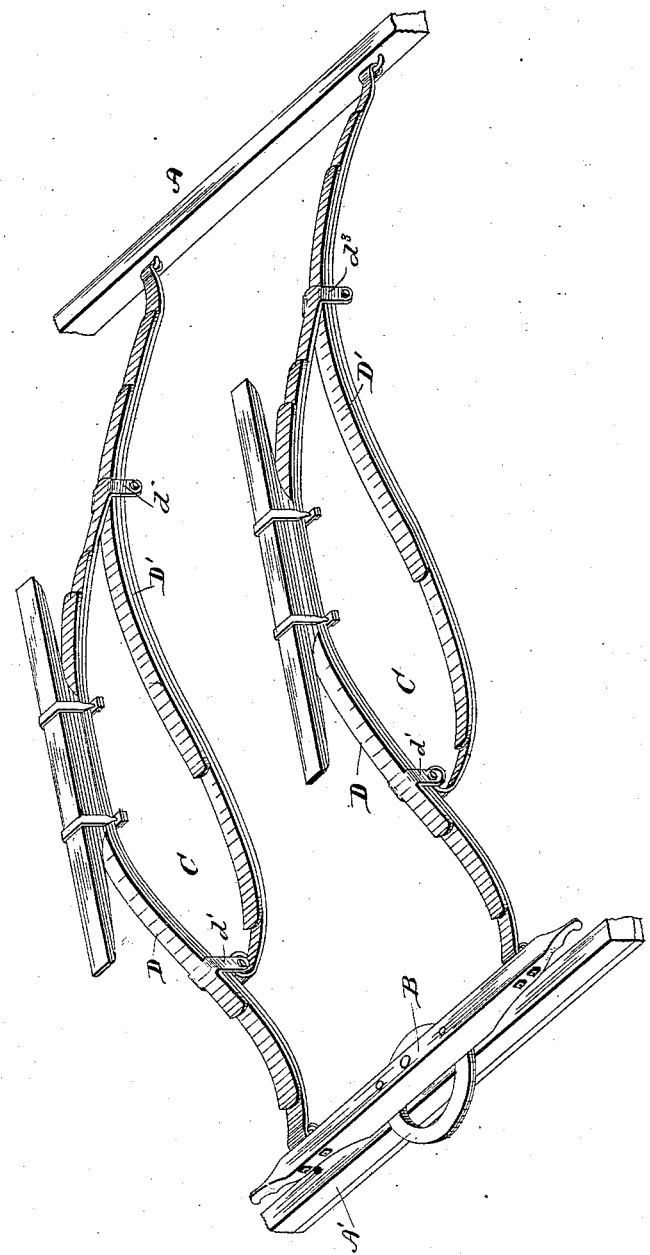
WITNESSES
Chas. R. Burr
A. J. Stewart
INVENTOR
Alexander H. Dickey
by Church & Church
his Attorneys

United States Patent Office.

ALEXANDER H. DICKEY, OF CONNERSVILLE, INDIANA.

VEHICLE-SPRING.

SPECIFICATION forming part of Letters Patent No. 312,441, dated February 17, 1885.

Application filed August 18, 1884. (No model.)

*To all whom it may concern:*

Be it known that I, ALEXANDER H. DICKEY, of Connersville, in the county of Fayette and State of Indiana, have invented a certain new and Improved Vehicle-Spring; and I do hereby declare the following to be a full, clear, and exact description of the same, reference being had to the accompanying drawing, forming part of this specification, and to the figures and letters of reference marked thereon.

My present invention has for its object to improve the construction and arrangement of the supporting-springs for vehicles, applicable more especially to that class of vehicles known as "side-bar or buckboard carriages," whereby a light, strong, and flexible support for the body is obtained; and my said invention consists in the several arrangements and combinations of parts, as hereinafter more fully described, and pointed out in the claims.

In the accompanying drawing, showing a perspective view, A represents the rear axle, A' the front axle, and B the cross-bar or head-block united to the front axle in the usual manner.

C C represent the side springs, each composed of two parts or sections, D D'. The front section, D, composed of two or more leaf-springs, is secured at one end to the front bolster by hinge-connections, in the ordinary way, and the rear section, D', is secured at one end to the rear axle in a similar manner. The two sections comprising the spring are curved substantially as shown and overlap each other, the rear end of the section D resting and sliding upon the section D', and being provided with the turned-down lugs or ears $d^3$, embracing said section and preventing lateral displacement thereon, and the forward end of the section D' supported upon a transverse bolt between the depending flanges $d'$, near the forward end of the section D, as shown. By thus constructing the springs of the two sections curved and attached as shown and described, I am enabled to employ and hence preserve the advantages of relatively long springs in a comparatively short space, and at the same time bring the body, which is to be attached to the section D, low down.

Having thus described my invention, I claim as new—

1. The combination, with the front bolster and the rear axle, of the spring consisting of two sections, the upper section connected to the front bolster at one end and resting and sliding upon the lower section at the other end, and said lower section fastened at one end to the rear axle and supported at the other end between lugs depending from the upper section, substantially as described.

2. The combination, with the rear axle and front bolster, of the spring consisting of the sections D and D', the section D having the lugs $d^3$ and $d'$, and the section D' secured to the rear axle at one end and at the other supported between the lugs depending from the section D, substantially as described.

ALEXANDER H. DICKEY.

Witnesses:
WILLIAM C. FORREY,
CHARLES F. SERODINO.